Aug. 9, 1949.　　　　H. T. FAUS ET AL　　　　2,478,625
THERMOMAGNETIC GALVANOMETER
Filed Aug. 31, 1948
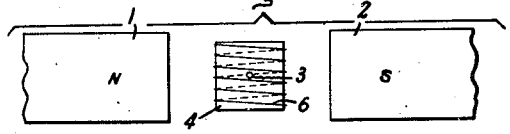
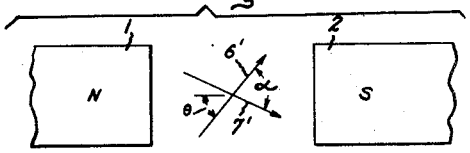
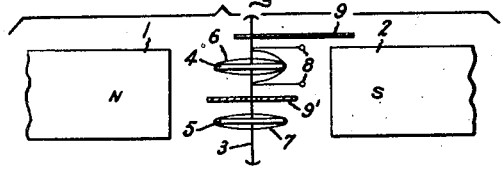
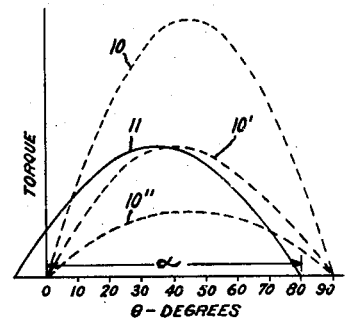
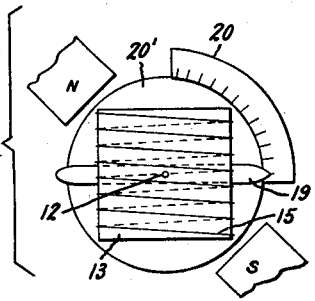
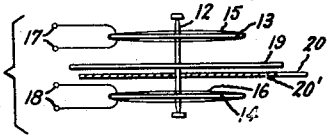
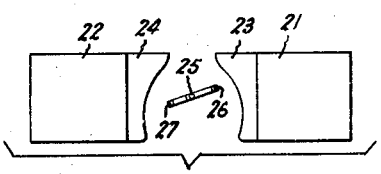
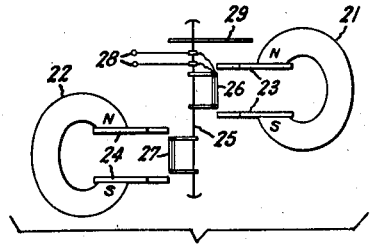
Inventors:
Harold T. Faus,
Laurence F. Perotte,
by Richard E. Hosley
Their Attorney.

Patented Aug. 9, 1949

2,478,625

UNITED STATES PATENT OFFICE 2,478,625

THERMOMAGNETIC GALVANOMETER

Harold T. Faus, Lynn, and Laurence F. Perotté, Arlington, Mass., assignors to General Electric Company, a corporation of New York Application August 31, 1948, Serial No. 46,974

20 Claims. (Cl. 171—95)

This invention relates to an improved galvanometer in which current is measured by its heating effect upon a thermomagnetic element.

An object of the invention is to provide an improved galvanometer capable of measuring direct currents and alternating currents with equal accuracy upon a common scale.

Another object is to provide an improved galvanometer capable of measuring small alternating currents with good accuracy substantially independent of frequency up to high radio frequencies.

Another object is to provide an improved ratiometer capable of determining the ratio between the magnitudes of two currents, which may be either D.-C. or A.-C. and may have equal or different frequencies.

Other objects and advantages will become apparent as the description proceeds.

The features of the invention which are believed to be novel and patentable are pointed out in the claims forming a part of this specification. For a better understanding of the invention, reference is made in the description which follows to the accompanying drawing in which Fig. 1 is a schematic plan view of one form of the invention; Fig. 2 is an elevation of the galvanometer shown in Fig. 1; Fig. 3 is a schematic diagram illustrating the relative alignment of thermomagnetic elements in the galvanometer shown in Fig. 1; Fig. 4 is a graphical representation of torques acting on the moving element of the galvanometer; Fig. 5 is a schematic plan view of a ratiometer embodying principles of this invention; Fig. 6 is an elevation of the ratiometer shown in Fig. 5; Fig. 7 is a plan view of another form of the invention; and Fig. 8 is an elevation of the galvanometer shown in Fig. 7. Where the same part appears in more than one figure of the drawing, is is always represented by the same reference number.

Referring now to Figs. 1 and 2, a magnet has a north pole 1 and a south pole 2 positioned to provide a magnetic field about the moving element of the galvanometer. Preferably the magnet is a permanent magnet, but a D.-C. excited electromagnet or even an A.-C. excited electromagnet may be used. A rotatable member or shaft 3 has an axis of rotation perpendicular to the direction of the magnetic field. Member 3 may be supported by jeweled bearings, as is conventional in instrument construction. Two plates 4 and 5, preferably made from very thin sheets of non-magnetic insulating material such as mica, are attached to member 3 perpendicular to its axis of rotation and within the magnetic field provided by poles 1 and 2. The thin plates 4 and 5 may be rectangular in shape represented in Fig. 1.

Wires 6 and 7 are wound about plates 4 and 5 respectively. These wires, and wire 6 in particular, are wound to have minimum values of inductance. There are two reasons for this: First, it is desired that the wires have substantially constant impedances, as nearly as possible independent of frequency. Second, it is desired that currents passing through the wires produce substantially no net magnetic flux which would interact with the magnetic field between poles 1 and 2 to produce a torque acting to rotate member 3. If plates 4 and 5 are very thin sheets of mica, wires 6 and 7 may be wound around the plates in a continuous spiral. The inductance of such a winding will not be appreciable because the area enclosed by each loop is very small due to the thinness of the plates and, consequently, there is little magnetic flux linkage by the loops. If thicker plates are used, or if even lower values of inductance are desired, more elaborate methods of non-inductive winding may be used.

It is known that certain materials, notably certain iron-nickel and nickel-copper alloys, are thermomagnetic; that is, these alloys have a magnetic permeability which varies considerably with temperature changes. Wires 6 and 7 are made of such an alloy, preferably one having a permeability which decreases in a substantially linear manner as its temperature is increased from ambient room temperature to several hundred degrees Fahrenheit above room temperature. Alloys of this type are commercially available, one example being an alloy of 29% nickel and 71% iron which has been specially heat treated to enhance its thermomagnetic properties. Wires 6 and 7 are usually made of the same alloy, but in special instances may be of different thermoelectric alloys to obtain best compensation for ambient temperature variations and other factors.

The attraction of thermomagnetic wires 6 and 7 by the magnetic field between poles 1 and 2 tends to swing the wires into alignment with the field. Thus, if either wire is not in alignment with the field, the attraction of the wire by the field produces a torque which acts on member 3 and tends to rotate such member in a direction to bring the thermomagnetic wire into alignment. However, wires 6 and 7 are so wound that they extend in respective directions at an angle to each other, so that both wires cannot be in alignment with the magnetic field at the same time. If either wire is aligned with the field, the attraction of the other wire by the field produces a torque acting to rotate member 3. As a result, member 3 rotates to a position in which neither wire is aligned with the field, but in which the attraction of the two wires by the field produces two equal opposing torques. This is more clearly illustrated in Figs. 3 and 4.

In Fig. 3, arrow 6' indicates the direction of wire 6, and arrow 7' indicates the direction of wire 7. The angle between these directions is represented by $\alpha$. This is a fixed angle depending upon the relative directions in which the wires are wound. The angular displacement of wire 6 away from alignment with the field is represented by $\theta$. This angle varies as member 3 rotates. The attraction of wire 6 by the magnetic field produces a clockwise torque acting to reduce angle $\theta$, while the attraction of wire 7 by the field produces a counterclockwise torque acting to increase angle $\theta$.

Refer now to Fig. 4, which is a graphical representation of these opposing torques. Suppose $\alpha$ is 80°, and that the attraction of wire 6 by the magnetic field is twice as great as the attraction of wire 7. This difference in the attractive forces may be due to a difference in size of the two wires, for example wire 6 may be twice as long as wire 7, or due to a difference in their magnetic permeabilities which may be caused by a difference in their temperatures. The clockwise torque due to attraction of wire 6 is represented by curve 10. Note that this torque is zero at $\theta=0$ and at $\theta=90°$; since at $\theta=0$ wire 6 is in alignment with the field and, therefore, there is no further tendency for it to rotate due to the attractive force of the field. and at $\theta=90°$ wire 6 is perpendicular to the field and so has no induced longitudinal magnetization. The counter-clockwise torque due to attraction of wire 7 is represented by curve 11. Curves 10 and 11 cross at $\theta=10°$ approximately. If $\theta$ exceeds 10°, the clockwise torque exceeds the counterclockwise torque, and member 3 rotates to reduce $\theta$. If $\theta$ is less than 10° the counterclockwise torque exceeds the clockwise torque and member 3 rotates to increase $\theta$. Member 3 thus rotates to a position where $\theta=10°$. Conventional damping means may be used to prevent oscillation.

Now, suppose that the temperature of wire 6 is increased, so that its permeability is decreased, until the attraction of wire 6 by the magnetic field equals the attraction of wire 7. Curve 10' now represents the clockwise torque due to attraction of wire 6. Curve 10' and curve 11 cross at $\theta=40°$, so member 3 is rotated to this position by the torques acting upon it. Suppose that the permeability of wire 6 is further reduced until the attraction of wire 6 by the magnetic field is only one-half the attraction of wire 7. Curve 10'' now represents the clockwise torque. Curves 10'' and 11 cross at $\theta=70°$ approximately, so member 3 rotates to the position where $\theta=70°$.

It follows that the angular position of member 3 is dependent upon the relative permeabilities of wires 6 and 7, and hence upon their relative temperatures. Changes in ambient temperature do not materially affect this angular position, because such changes affect the permeabilities of both wires alike, and hence do not appreciably change the relative values of the two torques.

Wire 7 is essentially a biasing means to provide a counter-torque to balance the torque provided by wire 6. This counter-torque can be provided by other biasing means, such as a spring, where the ambient temperature remains constant. Under normal operating conditions, however, ambient temperature varies appreciably. This would introduce errors unless the counter-torque provided by the biasing means varies responsive to such temperature changes in the same manner as the torque provided by wire 6.

The maximum rotation of member 3 is always somewhat less than the angle $\alpha$, as is evident from a consideration of Fig. 4. Therefore, it is generally desirable that $\alpha$ be as large as possible, to secure a long-scale indication. But $\alpha$ cannot be as large as 90°. If $\alpha=90°$, curves 10 and 10'' both cross curve 11 at $\theta=0$ and $\theta=90°$ and at no other point, while curves 10' and 11 coincide for all values of $\theta$. A good value of $\alpha$ for a practical long-scale galvanometer is about 80°, as illustrated in Fig. 4.

Again referring to Figs. 1 and 2, connections 8 are provided to pass a current to be measured through wire 6. These connections are flexibly joined to wire 6 by means commonly employed in meter construction, in such manner as to produce as little torque on shaft 3 as possible. When current is passed through wire 6, the wire is heated by the resistance losses in the wire, and this heating causes a shift in position of member 3, as has been described. The amount of heating is proportional to the square of the r. m. s. value of the current, and is substantially the same for D.-C. and A.-C., irrespective of frequency. The shift in position of member 3 indicates the r. m. s. value of current flowing through wire 6. A pointer 9 may be attached to member 3, and may cooperate with a conventional ammeter scale, not shown, calibrated in amperes or milliamperes. The pointer is not shown in Fig. 1, to permit a better view of plate 4 and wire 6.

If the galvanometer is to respond quickly to current changes, wire 6 should have a large surface exposed to the air, and there should be little opportunity for thermal storage in the supporting member. These conditions are met if wire 6 has a small diameter, 1 mil for example, and is wound about a thin mica plate 4 in the manner hereinbefore described. If time delay in the action of the instrument is desired, as where the galvanometer is to be used to operate protective equipment on sustained overloads, thermal storage may be increased by making the wire and its supports thicker and heavier.

A small diameter wire 6 is also desirable to provide good sensitivity. A wire 6 having a diameter of 1 mil and a length sufficient to provide a resistance of 50 ohms is suitable for measuring currents in the order of 1 to 5 milliamperes. For larger currents, a larger diameter wire may be used.

Where the shaft of the instrument is made vertical, it is preferable to have the current heated element above the compensating element as illustrated in Figs. 2 and 7. This reduces heat transfer from the heated element to the compensating element by convection. A heat barrier 9' may be placed between the two elements to block air currents and to reduce heat transfer by radiation. The heat barrier may be a disk with a hole in the center for the shaft, and may be attached to and rotated with the shaft or may remain stationary while the shaft rotates. Preferably the barrier has a polished reflecting surface for greatest reduction of radiant heat transfer.

Refer now to Figs. 5 and 6, which schematically illustrate a ratiometer. This instrument is essentially the same as the one shown in Figs. 1 and 2; except that connections are provided for passing currents through both thermomagnetic wires, so that the two wires are heated by relative amounts which depend upon the relative values of the two currents. Since only the heating effects of the currents are measured, the currents may be either D.-C. or A.-C., and of the same or different frequencies. A magnet, preferably a permanent magnet, provides a magnetic field. A rotatable member 12 is positioned with its axis of rotation perpendicular to the direction of this field. Attached to this member are two mica plates 13 and 14, and non-inductively wound about these plates are two thermomagnetic wires 15 and 16. Wires 15 and 16 are held in fixed relation to member 12, extending in directions perpendicular to the axis of rotation, but not in alignment with the magnetic field or with each other, by plates 13 and 14. Connections 17 and 18 are provided to pass the two currents to be compared through the two wires. The permeabilities of the two wires are reduced by amounts depending upon the respective values of the two currents, so that their relative permeabilities, and hence the angular position of member 12, depends upon the ratio of the currents. A pointer 19 cooperating with a scale 20 indicates the angular position of member 12. Scale 20 may be attached to, or a part of, heat barrier 20', as shown in the drawing. Heat barrier 20', reduces heat transfer between the two thermomagnetic elements.

Refer now to Figs. 7 and 8, which illustrate another galvanometer embodying principles of this invention. Magnets 21 and 22 are provided with pole pieces 23 and 24, as shown. Rotatable member 25 has an axis of rotation parallel to the direction of the magnetic fields produced between the pole pieces of magnets 21 and 22 respectively. Thermomagnetic wires 26 and 27 are held in fixed relation to member 25, and extend in a direction parallel to the axis of rotation and to the magnetic fields. Connections 28 are provided to pass a current to be measured through wire 26. Pointer 29 indicates the angular position of member 25. The pointer is not shown in Fig. 7, to permit a better view of the manner in which wires 26 and 27 are supported.

Pole pieces 23 and 24 are so shaped that as member 25 rotates clockwise, wire 26 moves farther from pole piece 23, and wire 27 moves closer to pole piece 24. Conversely, when member 25 rotates counterclockwise, wire 26 moves closer to pole piece 23 and wire 27 moves farther from pole piece 24.

Since the intensity of the magnetic field decreases with distance from the pole pieces, the magnetic field intensity has components of gradient along the respective paths followed by the wires as member 25 is rotated. Thus, wire 26 is attracted counter-clockwise by the field of magnet 21. This produces a torque which tends to rotate member 25 counter-clockwise; and the attraction of wire 27 by the field produced by magnet 22 produces a torque which tends to rotate member 25 clockwise. These two opposing torques cause member 25 to assume a balance position which depends upon the relative degree of attraction of the two wires. Operation otherwise is identical with the operation of the galvanometer illustrated in Figs. 1 and 2. This galvanometer can also be converted into a ratiometer by adding connections to pass a second current through wire 27.

Other modifications will occur to those skilled in the art. For example, the magnet may be comprised in the moving element of the galvanometer and the thermomagnetic elements remain stationary; the relative movement of the elements is the same, and the principles of operation are not altered. As another example, the thermomagnetic elements may comprise members of thermomagnetic material and heating resistors in good thermal contact with each other. The current to be measured is then passed through the heating resistors, which heat the thermomagnetic material. However, due to the greater amount of material to be heated in this modification, the speed of response may be reduced somewhat.

Having described the principle of this invention and the best mode in which we have contemplated applying that principle, we wish it to be understood that the apparatus described is illustrative only, and that other means can be employed without departing from the true scope of the invention defined by the following claims.

What we claim as new and desire to secure by Letters Patent of the United States is:

1. A galvanometer comprising means to provide a magnetic field, a relatively movable thermomagnetic element positioned in such field, said thermomagnetic element being biased for motion in one direction and attracted in the opposite direction by the magnetic field, and connections to pass an electric current to be measured through said thermomagnetic element.

2. A galvanometer as in claim 1 in which the means to provide a magnetic field is a permanent magnet.

3. A galvanometer comprising a magnet, a relatively movable thermomagnetic element positioned within the field of said magnet so that magnetic attraction tends to produce relative motion of the magnet and the thermomagnetic element in one direction, biasing means tending to produce relative motion of the magnet and the thermomagnetic element in the opposite direction, and connections to pass an electric current to be measured through said thermomagnetic element.

4. A galvanometer comprising means to provide a magnetic field, a rotatable element, a thermomagnetic element attached to said rotatable element and positioned within the magnetic field so that attraction of the thermomagnetic element by the magnetic field produces a torque acting upon the rotatable element, means to provide a counter-torque acting upon the rotatable element, and connections to pass an electric current to be measured through said thermomagnetic element.

5. A galvanometer as in claim 4 in which the means to provide a counter-torque comprises a second thermomagnetic element attached to the rotatable element, said second thermomagnetic element having a temperature coefficient of permeability such that ambient temperature compensation is provided for said galvanometer.

6. A galvanometer as in claim 5 in which the rotatable element has a vertical axis of rotation and the second or compensating thermomagnetic element is positioned below the other or current-heated thermomagnetic element.

7. A galvanometer as in claim 5 having a heat barrier between the thermomagnetic elements.

8. A galvanometer comprising means to provide a magnetic field, a rotatable element having an axis of rotation substantially perpendicular to the direction of such field, at least one wire of thermomagnetic material, means to hold said wire in fixed relation to said rotatable element and within said magnetic field, said wire extending in a direction perpendicular to the axis of rotation but not in alignment with the magnetic field, so that the attraction of the thermomagnetic wire by the magnetic field produces a torque acting on the rotating element in a direction tending to align the wire with the field, means to provide a counter-torque acting upon the rotatable element, and connections to pass an electric current to be measured through said thermomagnetic wire.

9. A galvanometer as in claim 8 in which the means to hold the thermomagnetic wire in position is a non-magnetic plate attached to the rotatable element perpendicular to its axis of rotation, the thermomagnetic wire being non-inductively wound about said plate.

10. A galvanometer as in claim 8 in which the means to provide a counter-torque comprises a second wire of thermomagnetic material and means to hold the second wire in fixed relation to the rotatable element in a direction perpendicular to the axis of rotation and not in alignment with the magnetic field or the other thermomagnetic wire.

11. A galvanometer comprising a magnet to provide a magnetic field, a rotatable element having an axis of rotation perpendicular to the direction of such field, two plates of non-magnetic insulating material attached to the rotatable element perpendicular to its axis of rotation and within said magnetic field, two wires of thermomagnetic material non-inductively wound about said two plates respectively, said wires being thus held in fixed relation to said rotatable element and extending in directions perpendicular to the axis of rotation but not in alignment with the magnetic field or with each other, so that the attraction of the two thermomagnetic wires by the magnetic field produces opposing torques acting on the rotating element, and connections to pass an electric current to be measured through one of said thermomagnetic wires.

12. A galvanometer as in claim 11 in which the thermomagnetic material is an alloy of 29% nickel and 71% iron.

13. A galvanometer as in claim 11 in which the plates are mica.

14. A galvanometer as in claim 11 in which the angle between the respective directions of the two thermomagnetic wires is substantially 80°.

15. A ratiometer comprising a galvanometer as in claim 5 and connections to pass a second electric current through the second thermomagnetic element.

16. A ratiometer comprising a galvanometer as in claim 10 and connections to pass a second electric current through the second thermomagnetic wire.

17. A ratiometer comprising a magnet to provide a magnetic field, a rotatable element having an axis of rotation perpendicular to the direction of such field, two plates of non-magnetic insulating material attached to the rotatable element perpendicular to its axis of rotation and within said magnetic field, two wires of thermomagnetic material non-inductively wound about said two plates respectively, said wires being thus held in fixed relation to said rotatable element and extending in directions perpendicular to the axis of rotation but not in alignment with the magnetic field or with each other, so that the attraction of the two thermomagnetic wires by the magnetic field produces opposing torques acting on the rotating element, and connections to pass the two currents to be compared through said two thermomagnetic wires respectively.

18. A galvanometer comprising a rotatable element, at least one wire of thermomagnetic material, means to hold said wire in fixed relation to said rotatable element and extending in a direction parallel to its axis of rotation, means to provide a magnetic field having a direction parallel to said wire and an intensity which has a component of gradient along the path followed by said wire as the rotatable element is rotated, so that the attraction of the thermomagnetic wire by the magnetic field produces a torque acting upon the rotatable element in a direction tending to move the thermomagnetic element into a region of greater intensity of the magnetic field, means to provide a counter-torque acting upon the rotatable element, and connections to pass an electric current to be measured through said thermomagnetic wire.

19. A galvanometer as in claim 18 in which the means to provide a magnetic field is a magnet having pole pieces shaped so that the thermomagnetic wire moves closer to the pole pieces as the rotatable element is rotated in one direction and moves farther from the pole pieces as said element is rotated in the opposite direction.

20. A galvanometer as in claim 18 in which the means to provide a counter-torque comprises a second wire of thermomagnetic material, means to hold said second wire in fixed relation to said rotatable element and extending in a direction parallel to its axis of rotation, means to provide a magnetic field having a direction parallel to said second wire and an intensity which has a component of gradient along the path followed by the wire such that as one thermomagnetic wire moves into a region of greater magnetic field intensity the other thermomagnetic wire moves into a region of lesser magnetic field intensity.

HAROLD T. FAUS.
LAURENCE F. PEROTTE.

REFERENCES CITED

The following references are of record in the file of this patent:

UNITED STATES PATENTS

| Number | Name | Date |
|---|---|---|
| 1,033,409 | Joly | July 23, 1912 |
| 1,608,872 | Wallis | Nov. 30, 1926 |
| 2,322,069 | Stimson | June 15, 1943 |